Dec. 17, 1957    J. R. BURTON    2,816,442
TEMPERATURE INDICATING SYSTEM
Filed May 20, 1955    2 Sheets-Sheet 1
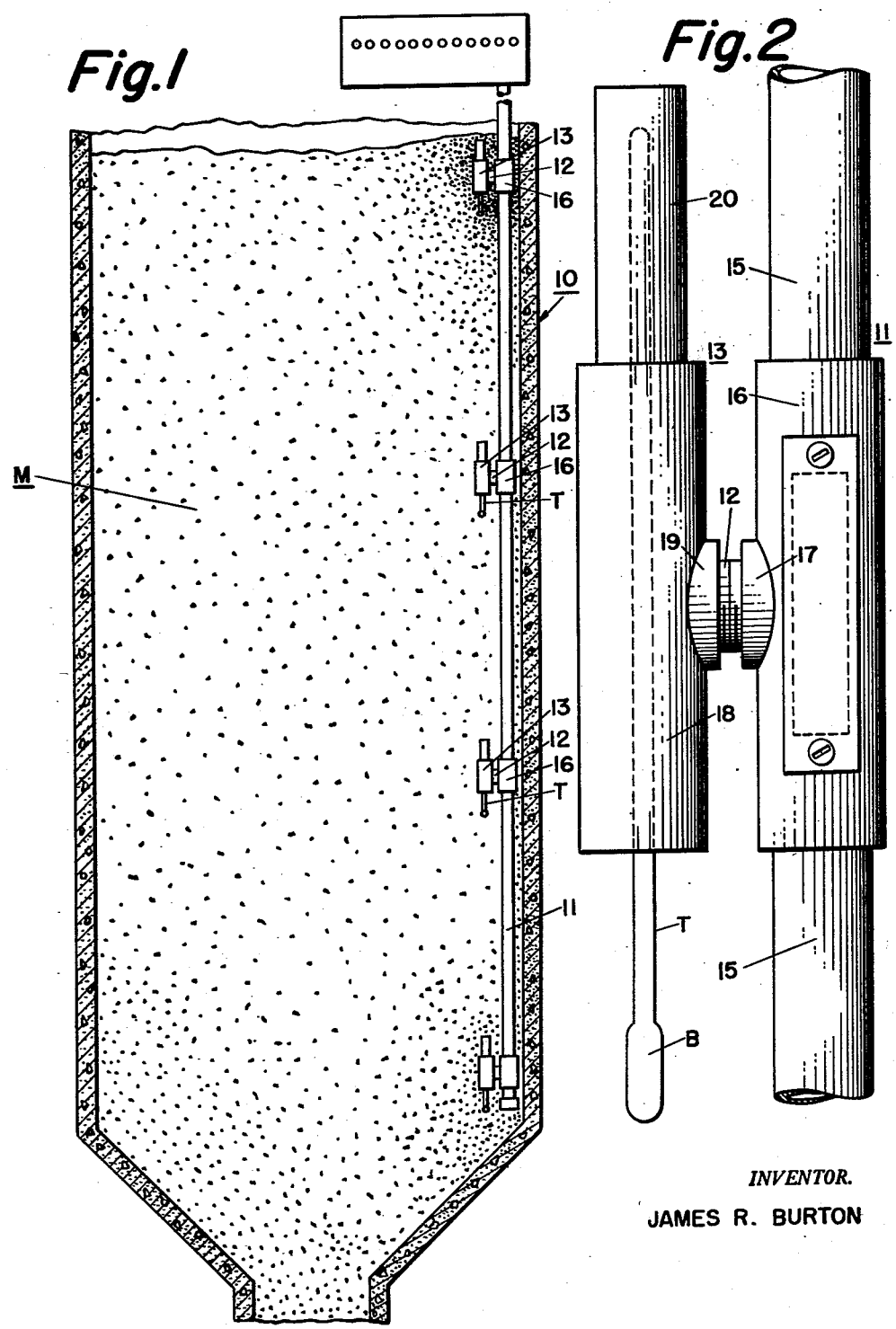
INVENTOR.
JAMES R. BURTON Dec. 17, 1957  J. R. BURTON  2,816,442
TEMPERATURE INDICATING SYSTEM
Filed May 20, 1955  2 Sheets-Sheet 2

INVENTOR.
JAMES R. BURTON

United States Patent Office 2,816,442
Patented Dec. 17, 1957

2,816,442

TEMPERATURE INDICATING SYSTEM

James R. Burton, Katy, Tex.

Application May 20, 1955, Serial No. 509,792

2 Claims. (Cl. 73—340)

This invention relates to an arrangement for indicating the temperature existing in a body of material, such as a mass of grain in a storage vessel. In particular the invention is concerned with an electrical system for storage vessels containing large volumes of grain or other vegetable matter, which is arranged to indicate the temperature existing in different zones within the mass of stored material in order that the rate of temperature rise of the mass can be determined.

The storage of grain presents an economic risk which becomes substantial especially during the initial curing period or when the material is undergoing the process of drying. This is due to spoilage caused by abnormally high temperature which may be generated within the body of material. The existence of such high temperatures in any zone or portion of the material not only spoils the material in the localized high temperature zone but also subjects the entire mass to spoilage by the physical or chemical reactions which may take place with the result that the entire mass becomes valueless or is substantially reduced in value.

Various arrangements have heretofore been proposed for indicating the high temperatures existing in a mass of grain but these generally have involved the use of thermostats, thermocouples, thermistors etc. The use of these elements is generally limited because of the prohibitive expense involved in the installation of an effective system for large storage vessels.

My invention consists in the provision of a group of thermoelements such as thermometers in which a liquid expands or increases in volume under increased temperature. The elements are disposed in superposed zones between the upper and lower ends of the vessel and are arranged in such a manner that different temperatures within any zone of the mass may be visually or otherwise indicated. The thermoelements are arranged in groups and the elements of each group are disposed within the mass at selected zones so that any temperature existing in any zone will be indicated at a common indicating means. If any temperature or the rate of rise of the temperature is abnormal, suitable precautions may be taken to prevent damage to the body of material.

According to the invention the reservoir end of each thermoelement of a group is disposed in a selected zone, preferably in close proximinity to the storage vessel wall although the selected zone may extend generally centrally of the vessel. Conductors are placed in communication with the path of the expansible liquid at one or more selected points and contact is made between the conductors and the liquid as it is transmitted from the reservoir under increased temperature. The conductor leads are confined in a housing disposed within the vessel and extend upwardly of the vessel to be in circuit with the temperature indicating means.

The thermoelements of each group may be disposed in spaced horizontal relation within the reservoir and positioned inwardly of the mass and each element be provided with a single conductor. The thermoelements may be vertically disposed in superposed relation and each have a plurality of conductors connected therewith at vertically spaced points to provide a group of points which will indicate the existing temperatures.

For a more detailed understanding of the invention reference may be had to the accompanying drawings in which:

Figure 1 is a view in sectional elevation of a vessel with the invention shown diagrammatically as applied to a group of vertically disposed thermoelements.

Figure 2 is an enlargement of a portion of Figure 1 to show details;

Figure 3:
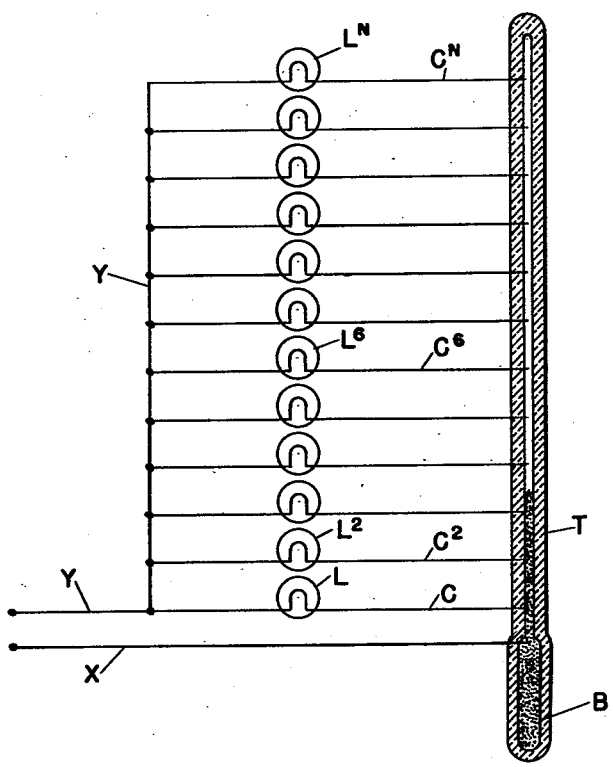
Figure 3 is a schematic view of one of the thermoelements and associated visual indicators.

In Figures 1 and 2 the numeral 10 indicates a storage vessel containing a mass of granular material M. A conduit 11 is disposed vertically of the vessel within the body of material and has a plurality of lateral branches 12 extending therefrom each of which communicates with a housing shown generally at 13 for supporting a thermoelement T. Each thermoelement T has its reservoir end B disposed in direct heat conducting relation with the material and its elongate liquid path portion P substantially enclosed by the housing 13.

The conduit 11 is made of a plurality of similar sections 15 which are interconnected by an outer joint 16 having a flange connection 17 for receiving one end of a lateral branch 12. Each branch is in turn joined to the lower section 18 of the housing 13. For simplicity of assembling the device the lower section 18 is constructed generally similarly to the joints 16 and has a lateral flange 19 positioned to receive the other end of a branch 12. Each thermoelement T is suitably supported within the lower section 18 and a cap member 20 is connected to and supported by the lower section 18 to enclose and prevent entry of any granular material into the housing and also to provide an arrangement whereby only the reservoir end B of the thermoelement is principally subjected to the heat of the material.

In Figure 3, the electrical circuit for a single thermoelement is shown and comprises a selected number of conductors C through $C^N$ which extend through the wall of the thermoelement T in a manner to make contact with the liquid as it rises on temperature increase within the zone of material surrounding the reservoir end B. The conductors are each provided with indicators, such as, lights L to $L^N$. The lights are arranged to have differentiating shades or colors to visually indicate the progressive increased temperatures existing in the zone of material in which the reservoir end of the thermoelement is located. The thermoelement and its associated conductors are arranged to provide circuits between the respective current supply and return lines X and Y and as the temperature rises in the zone in which the end B is located the circuits will operate in parallel to visually indicate the progressional increases.

Figure 4:
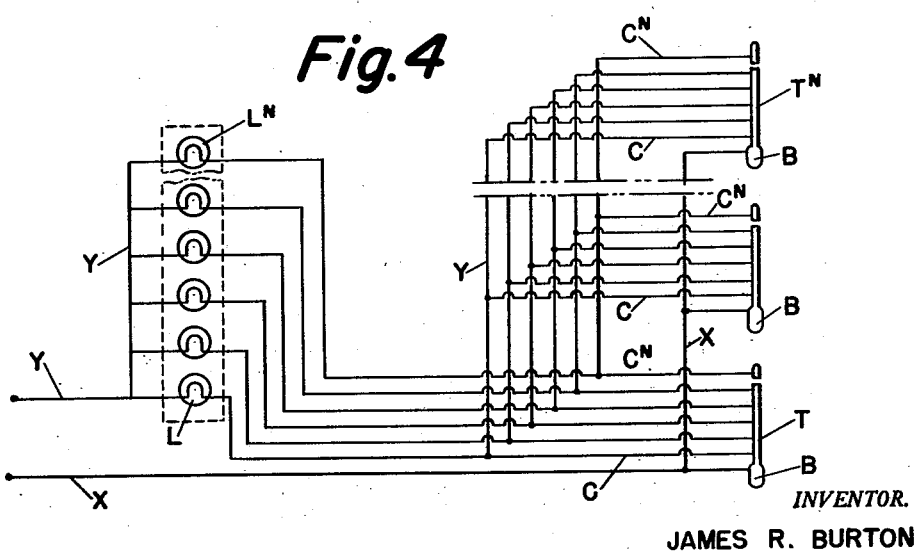
Figure 4 is a view of the plurality of thermoelements and the associated visual indicator.

In Figure 4, is shown a plurality of thermoelements T-$T^N$ which are representative of any selected number. The thermoelement T will be disposed within a zone at the lower end of a storage vessel while the upper element $T^N$ will be positioned within the uppermost zone and a suitable number of other thermoelements provided therebetween.

Each thermoelement will be provided with a plurality of conductors as shown at C-$C^N$ and each is arranged to provide a plurality of parallel circuits between the supply and return lines X and Y. The lowermost conductor of each thermoelement will form a group and be placed in circuit with the lowermost light through suitable connections, as shown but not indicated, and as the temperature rises in any of the zones where the ends B of the thermo-elements are positioned, the expanding liquid will make contact with at least one of the conductors, and the light L will be energized to be indicative of that temperature. Similarly the second, third and so forth conductors through $C^N$ will form a group and be placed in circuit with the corresponding lights through suitable connections and the temperatures indicated by the associated lights as the liquid expands in any of the elements to energize the lights.

The utility of the invention can be readily appreciated by its application to the storage of grain, for example rice, for curing or drying.

Assume that a particular storage bin has received a large quantity of rice but the time schedule of its drying requires that the grain remain in a storage bin for a specified period. During this period the column of indicator lights associated with the particular storage bin can be observed to obtain a periodic check on the temperatures.

When the temperature of the grain in any zone rises to the lowest temperature for which the system is set to operate, the bottom indicator light will glow and remain in this condition until the temperature in all zones of the bin lowers. On temperature increase, the next and other lights operate depending on the degree of temperature rise until the maximum temperature for which the system is set to operate is reached when all the lights in the system will be glowing simultaneously.

The rate of temperature rise within the mass can be determined from the time required for the mass to rise from the lowest to the next highest temperature or any other temperature for which the lights are set to operate. From the rate of temperature rise can be established the day or period when damage to the material may occur and suitable precautions taken.

I claim:

1. Apparatus for indicating temperature within a mass of granular material of substantial height comprising a group of thermoelements arranged vertically within the mass in superposed zones, each thermoelement having a lower reservoir section containing an expansible liquid and a communicating upper tubular section, each tubular section being of confined cross-sectional area and providing an elongate path for transmitting the liquid upwardly from the reservoir in accordance with temperature increase in the granular material adjacent its reservoir section, a plurality of conductors in communication with each tubular section at spaced apart points vertical thereof, said conductors being arranged in groups and each group consisting of one conductor from a similar vertical point on each element, a light in circuit with each group of conductors, a power supply line in circuit with the liquid in the reservoir section of each thermoelement and a power return line in circuit with each of said lights, each conductor of any group of conductors being operative upon increased temperature in any zone of the granular material adjacent the reservoir section of any thermoelement and the resultant expansion of the liquid upwardly in the transmitting path of that thermoelement to complete the circuit to one of said lights and each of said lights being adapted to give a different visual indication from another light whereby the circuit made by any conductor at the upper points of the thermoelements will visually indicate the existance of dangerous temperature conditions within the granular material.

2. Apparatus as in claim 1 further characterized by a conduit extending vertically within the mass of material for receiving and enclosing the conductors and a plurality of independent housings supported by the conduit wherein each housing mounts a thermoelement therewithin and has a closed upper end for preventing entry of the granular material to the housing and contact with the tubular sections of the thermoelements and each housing has an open lower end to permit contact of the granular material with the reservoir portion of the thermoelement.

References Cited in the file of this patent
UNITED STATES PATENTS

| | | |
|---|---|---|
| 455,268 | Wiesebrock | June 30, 1891 |
| 489,212 | Bartlett | Jan. 3, 1893 |
| 1,181,226 | Kenyon | May 2, 1916 |